United States Patent [19]

Nasu et al.

[11] Patent Number: 4,874,200
[45] Date of Patent: Oct. 17, 1989

[54] MODULAR VEHICLE BODY

[75] Inventors: Tetsuji Nasu, Yokohama; Jun Shiina, Zama, both of Japan

[73] Assignee: Nissan Motor co., Ltd., Yokohama, Japan

[21] Appl. No.: 174,914

[22] Filed: Mar. 29, 1988

[30] Foreign Application Priority Data

Mar. 30, 1987 [JP] Japan .................................. 62-77206

[51] Int. Cl.⁴ ............................................. B62D 25/00
[52] U.S. Cl. .................................................. 296/197
[58] Field of Search ............... 296/185, 187, 192, 197, 296/201, 204, 203; 29/430

[56] References Cited

U.S. PATENT DOCUMENTS 3,021,172 2/1962 Fiala et al. .......................... 296/203
4,422,685 12/1983 Bonfilio et al. ...................... 296/197

Primary Examiner—Joseph F. Peters, Jr.
Assistant Examiner—Jesus D. Sotelo
Attorney, Agent, or Firm—Foley & Lardner, Schwartz, Jeffery, Schwaab, Mack, Blumenthal & Evans

[57] ABSTRACT

A vehicle body consists of a plurality of independent body sections, i.e., an engine compartment assembly, floor assembly, front end assembly, rear end assembly, a pair of body side assemblies and a roof assembly. The assemblies are prepared and painted indendently and fastened together with bolts and nuts. A ground system is provided which electrically connects the assemblies to each other at the time of the fastening.

6 Claims, 2 Drawing Sheets

MODULAR VEHICLE BODY

BACKGROUND OF THE INVENTION

1. Field of the Invention

The present invention relates to a modular vehicle body.

2. Description of the Prior Art

Unitized bodies have been used for many types of automobiles, particularly for most passenger cars. The unitized bodies however have a difficulty in installation of components and inspection of same since acess to the spaces for disposition of the components is obstructed by the body section enclosing the spaces. For example, installation of some devices, components or upholsteries requires a worker to get into a vehicle cabin or to get his hands into a vehicle cabin through an opening of a vehicle body, resulting in the necessity of an awkward, difficult and time-cosuming work and therefore an expensive assembly work.

SUMMARY OF THE INVENTION

In accordance with the present invention, there is provided a novel vehicle body structure which is constituted by a pluraliy of independent body sections, i.e., an engine compartments assembly, floor assembly, a pair of body side assemblies and a roof assembly.

The engine compartment assembly has a cowl box and a dash lower panel at the rear end thereof. The floor assembly has a front floor panel and a rear floor panel. Each of the body side assemblies has a front pillar, rear pillar, roof side rail and a side sill. The roof assembly has a roof panel.

The assemblies are fastened together by mechanical fastening means and electrically connected to each other by grounding means.

In one form of the invention, the grounding means comprises a bolt and nut constituting part of the mechanical fastening means and a grounding plate brought into contact with the bolt. The bolt has a head portion formed with an annular pointed seating and adapted to cut into a paint coating when tightened for thereby being electrically connected with one of the matched pair of the assemblies and having a surface protected from mbeing painted and brought into contact with an end of the bolt. The bolt has an annular sealing member surrounding the annular pointed seating so as to provide a seal to the joint between the head portion of the bolt and one of the matched pair of the assemblies.

In another form of the invention, a matched pair of the above mentioned assemblies have flanges at which they are joined, and the grounding means comprises a tacking pin secured to one of the flanges in such a way as to be electrically connected to same The grounding means is provided having a leg portion projecting from the aforementioned one flange and protected from being painted and further having a grounding plate fitted on the other of the aforementioned flanges. The grounding plate having a contact portion is lain on the aforementioned other flange and a clip portion grips the aforementioned other flange. The grounding plate being protected from being painted. The grip portion having a pair of teeth adapted to bite into a paint coating covering the aforementioned other flange when the grip portion is fitted on the aforementioned other flange. The contact portion is formed with a hole aligned with the hole in the aforementioned other flange. The leg portion of the tacking pin is fitted in the hole in the contact portion through the hole in the afoermentioned other flange and thereby is electrically connected with the contact portion.

The above structure is effective for attaining a vehicle body which is free from the above noted problem inherent in the prior art vehicle bodies and can be used as an electrical conductor similarly to the prior art unitized vehicle bodies.

It is accordingly an object of the present invention to provide a novel vehicle body structure which makes it possible to attain the installation and inspection of devices, components and upholsteries with ease and efficiency and which can be used as an electrical conductor similarly to a prior art unitized vehicle body.

It is another object of the present invention to provide a novel vehicle body structure which can be produced with ease and efficiency.

It is a further object of the present invention to provide a novel vehicle body structure which can reduce the assembling expense considerably.

It is a further object of the present invention to provide a novel body vehicle structure which is suited for manufacture and assembly using robots.

It is a further object of the present invention to provide a novel vehicle body structure which makes it possible to attainvarious types of vehicles with ease and efficiency.

It is a further object of the present invention to provie a novel method of producing a vehicle body structure of the above described character.

DETAILED DESCRIPTION OF THE PREFERRED EMBODIMENS

Figure 1:
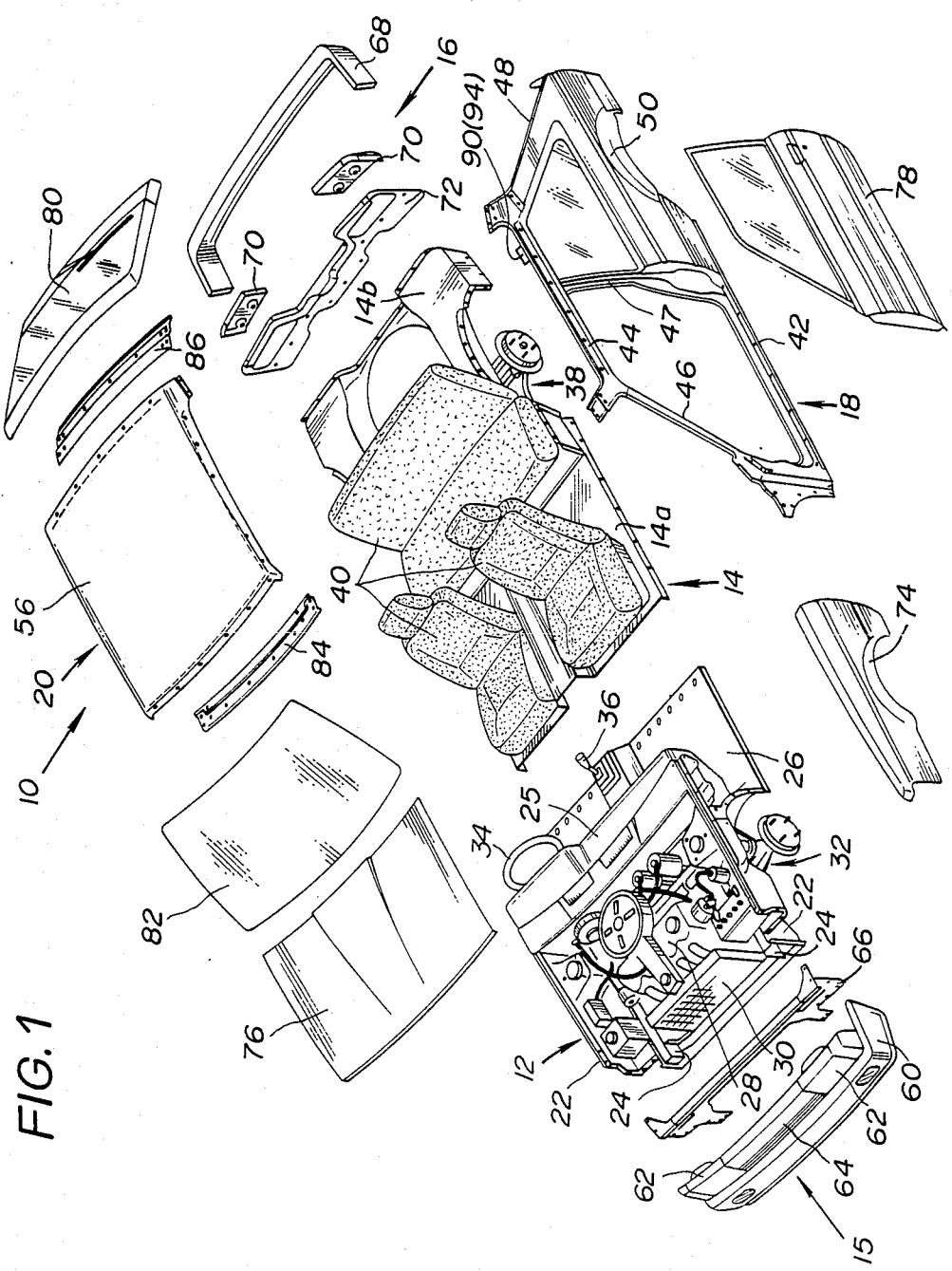
FIG. 1 is an explodedd view of a modular vehicle body incorporating a grounding system of the present invention.
Figure 2:
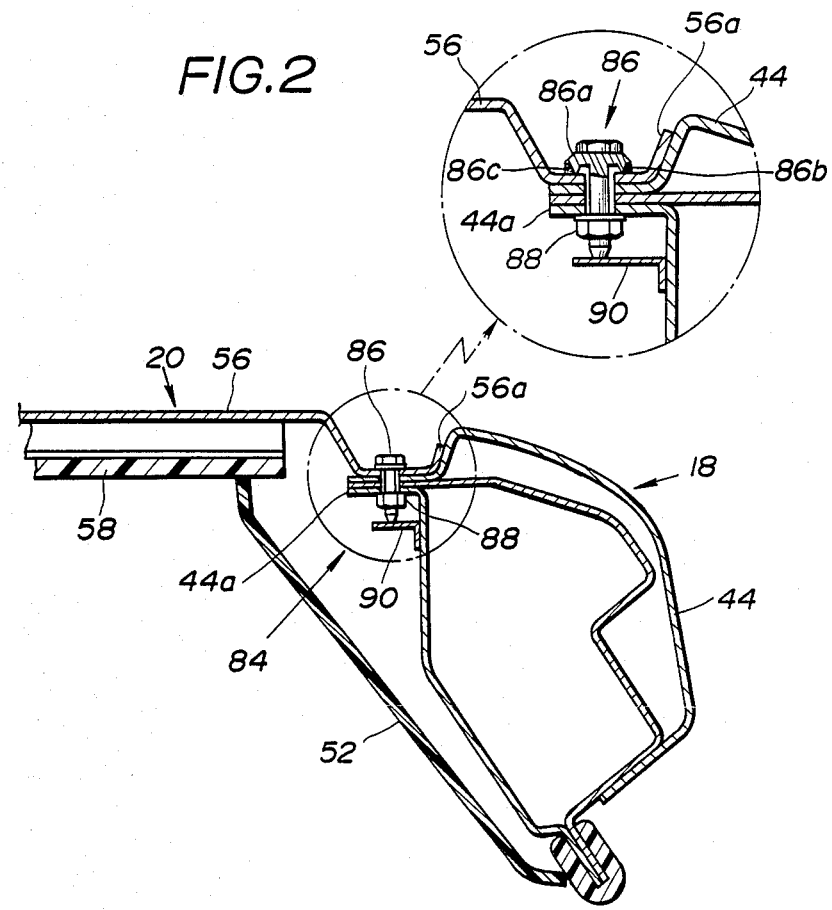
FIG. 2 is a sectional view of the grounding system according to an embodiment of the present invention, with a partly enlarged portion.

Referring first to FIGS. 1 and 2, a modular vehicle body structure 10 is constituted by a plurality of independent vehicle body sections, i.e., an engine compartmentn assembly 12, floor assembly 14, front end assembly 15, rear end assembly 16 and a pair of body side assemblies, though only one 18 is shown, and a roof assembly 20.

The engine compartment assembly 12 includes a pair of hood ledge panels 22 and 22, a pair of longitudinal members 24 and 24, cowl box of air box 25, dash lower panel 26, etc. which are welded together. The engine compartment assembly 12 is equipped with devices, componeonts and upholsteries such as an engine 28, radiator 30, electric accessories (no numeral), front suspension 32, steering wheel 34, gear shift unit 36, etc.

The floor assembly 14 includes a front floor panel 14*a*and a rear floor panel 14*b*which are joined together to constiute an integral unit. The floor assembly 14 is equipped with devices, components and upholseries such as a rear suspension 38 and seats 40, etc.

Each body side assembly 18 includes a side sill 42, roof side rail 44, front pillar 46, center pillar 47, rear pillar 48, rear fender 50, etc. The body side assembly 18 is equipped with devices, components and upholsteries such as a body side trim member 52 (refer to FIG. 2), sun visor (not shown), etc.

The roof assembly 20 includes a roof panel 56 and roof bows (not shown) secured to the roof panel 56. The roof assembly 20 is painted and equipped with devices, components and upholsteries as a room lamp (not shown), roof trim 58 (refer to FIG. 2), etc.

The front end assembly 15 includes a front bumper 60, head lamp 62, front grille 64, radiator core support 66, etc.

The rear end assembly 16 includes a rear bumper 68, rear combination lamp 70, rear panel 72, etc.

A front fender 74, engine hood 76, front doors 78 though only one is shown, back kdoor 80, windshield 82, etc. are installed in place after the foregoing assemblies are joined together to constitute a nearly complete vehicle structure.

The engine compartment assembly 12 is joined with the floor assembly 14 in the manner of butt joint. More specifically, the engine compartment assembly 12 and floor assembly 14 are joined together by fastening the lower end of the dash lower panel 26 and the front end of the front floor panel 14a are laid one upon the other and fastened together with bolt and nuts.

Each body side assembly 18 is placed on the lateral ends of the engine compartment assembly 12 and the floor assembly 14 and fastened thereto with bolts and nuts.

The roof assembly 20 is laid on the upper ends of the body side assemblies 18 and fastened with bolts and nuts to same together with the front roof rail 84 and rear roof rail 86.

The front end assembly 15 is laid on the front end of the engine compartment assembly 12 and fastened to same with bolts and nuts whilst the rear end assembly 16 is laid on the rear ends of the floor assembly 14 and the body side assemblies 18 and fastened to same with bolts and nuts.

The modular vehicle body structure 10 is equipped with a grounding system 84 for electrically connecting the foregoing assemblies 12, 14, 15, 16, 18 and 20 when the assemblies are joined together. For example, body side assembly 18 and the roof assembly 20 are electrically connected to each other at the joint between an upper flange 44a of the roof side rail 44 and a lateral flange 56a of the roof panel 56 by means of the grounding system 84. In this embodiment, the grounding system 84 is adapted to effectively utilize at least one 86 of the bolts for fastening the body side assembly 18 and the roof assembly 20 to each other. The bolt 86 has a head portion 86a formed with an annular pointed seating 86b, i.e., the bolt 86 has a head portion 86a the lower end of which is formed into an annular contact 86b having an annular pointed lower end. The bolt 86 has a sealing member 86c around the circumferential periphery of the pointed seating or contact 86b to provide a seal to the joint between the contact 86b and the lateral flange 56a of the roof panel 56. The upper flange 44a of the roof side rail 44 has a lower face to which a nut 88 is welded whilst a grounding plate 90 is disposed adjacently below the nut 88 and welded to the roof side rail 44. The grounding plate 90 is masked at the time of painting of the body side assemblies 18 so as not to be covered by a paint coating.

With the foregoing structure, fastening the lateral flange 56a of the roof 56 to the upper flange 44a of the roof side rail 44 with the bolt 86 and the nut 88 at the time of joining of othe body side assembly 18 and the roof assembly 20 causes the pointed seating 86b of the bolt 86 to cut or oite into the paint coating covering the lateral flange 56a to electrically connect the bolt 86 to the roof assembly 20 when the bolt 8 is tightened, thus providing an electrical connection between the bolt 86 and the roof assembly 20. Since the bolt 86 is also brought into contact with the grouding plate 90, an electrical connection is provided between the body side assembly 18 and the roof assembly 20.

The grounding system 84 further provides in a similar manner as above an electrical connection between the body side assembly 18 and the engine compartment assembly 12, an electrical connection between the body side assembly 18 and the floor assembly 14, an electrical connection between the body side assembly 18 and the rear end assembly 16, an electrical connection between the front end assembly 15 and the engine compartment assembly 12 and, in some cases, an electrical connection between the engine compartment assembly 12 and the floor panel 14.

Figure 3:
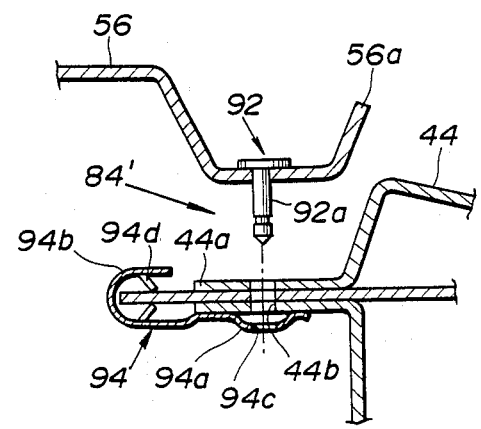
FIG. 3 is a sectional view of another embodiment of the present invention.

FIG. 3 shows another embodiment of the present invention. The grounding system 84' of this embodiment is provided with a tacking pin 92 attached to the lateral flange 56a of the roof panel 56 and having leg portion 92a projecting outwardly from the flange 56a. The leg portion 92 is masked so as not to be covered by a paint coating at the time of painting of the roof assembly 20. The upper flange 44a of the roofo side rail 44 is formed with a hole 44b in which the tacking pin 92 is fitted. The grounding system 84' is further provided with a grounding plate 94 attached to the upper flange 44a of othe roof oside rail 44. The grounding plate 94 has a contact portion 94a laid on the lower face of the flange 44a and a clip portion 94b adapted to grip the end portion of the upper flange 44a for thereby holding the contact portion 94a on the lower face of the falnge 44a. The contact portion 94a is formed with a hole 94c aligned with the corresponding hole 44b. The clip portion 94b has a plurality of teeth 94d which may be formed by cutting and bending of the clip portion 94b so that when the clip portion 94b is fitted on the flange 44a the teeth 94d are caused to cut or bite into the paint coating of the flange 44a to electrically connect the grounding plate 94 to the body side assembly 18. The tacking pin 92 is not limited to one but a plurality of tacking pins 92 may be used together with corresponding number of grounding plates 94.

With the foregoing structure, the tacking pin or pins 92 are inserted into the hole or oholes 94c through the hole or holesl 44c in order to attain temporary connection of the body side assembly 18 and the roof assembly 20 prior to permanent connection using bolts and nuts. The tacking pin or pins 92 are therefore operative not only to locate the body side assembly 18 and the roof assembly 20 relative to each other but to electrically connect via the grounding plate or plates 94 the lateral flange 56a to the upper flange 44a since the free end portion or portions of the tacking pin or pins 92 are adapted to fit not only in the hole or holes 44b in the upper flange 44a of the roof side rail 44 but in the hole or holes 94c of the grounding plate or plates 94. The grounding system 84' thus can electrically connect the body side assembly 18 to the roof assembly 20 at the time of joining thereof.

What is claimed is:

1. A vehicle body structure comprising:
an engine compartment assembly having a cowl box and a dash lower panel at the rear end thereof;

a floor assembly having a front floor panel and a rear floor panel;

a pair of body side assemblies each having a front pillar, rear pillar, roof side rail and a side still;

a roof assembly having a roof panel;

said engine compartment assembly, floor assembly, body side assemblies and roof assembly constituting independent vehicle body sections which are prepared and painted independently;

mechanical fastening means for mechanically fastening said engine compartment assembly, floor assembly, body side assemblies and roof assembly together; and grounding means for electrically connecting said engine compartment assembly, floor assembly, body side asemblies and roof assembly to each other.

2. A vehicle body structure as set forth in claim 1 wherein said grounding means comprises a bolt and a nut constituting part of said mechanical fastening means and a grounding plate brought into contact with said bolt, said bolt having a head portion formed with an annular pointed seating and adapted to cut into a paint coating when tightened for thereby being electrically connected with one of a matched pair of said assemblies, said ground plate being electrically connected with the other of the matched pair of said assemblies and having a surface protected from being painted and brought into contact with an end of said bolt.

3. A vehicle body structure as set forth in claim 2 wherein said bolt has an annular sealing member surrounding said annular pointed seating so as to provide a seal to the joint between said head portion of said bolt and one of the matched pair of said aassemblies.

4. A vehicle body structure as set forth in claim 1 wherein a matched pair of said assemblies have flanges at which they are joined, said grounding means comprising a tacking pin secured to one of said flanges in such a way as to be electrically connected to same, said grounding means having a leg portion projecting from said one flange and protected from being painted and further having a grounding plate fitted on the other of said flanges, said grounding plate having a contact portion laid on said other flange and a clip portion gripping said other flange, said grounding plate being protected from being painted, said clip portion having a pair of teeth adapted to bite into a paint coating covering said other flange when said clip portion is fitted on said other flange, said contact portion being formed with a hole aligned with a hole formed in said other flange, said leg portion of said tacking pin being fitted in said hole in said contact portion through said hole in said flange other and thereby being electrically connected with said contact portion.

5. A vehicle body structure as set forth in claim 1, further comprising a front end assembly having a radiator core support, and a rear end assembly having a rear end panel, said front end assembly and said rear end assembly being electrically connected to said engine compartment assembly and said floor assembly by said grounding means, respectively.

6. A vehicle structure comprising:

an engine compartment module having an engine compartment assembly and equipments including an engine and suspension, said engine compartment assembly constituting an independent vehicle body section and having a cowl box and a dash lower panel at the rear end thereof;

a floor module having a floor assembly and equipments including a suspension and seats, said floor assembly constituting an independent vehicle body section and having a front floor panel and a rear floor panel;

a front end module having a front end assembly and equipments including a head lamp and a front bumper, said front end assembly constituting an independent vehicle body section and having a radiator support core;

a rear end module having a rear end assembly and equipments including a rear combination lamp, said rear end assembly constituting an independent vehicle body section and having a rear end panel;

a pair of body side modules each having, though symmetrical about a vehicle body longitudinal axis, a vehicle body side assembly and equipments including a plurality of trim members, said body side assembly constituting an independent body section and having a front pillar, rear pillar, side sill and a roof side rail;

a roof module having a roof assembly and equipments including a ceiling member, said roof assembly constituting an independent vehicle body section and having a roof panel;

mechanical fastening means for mechanically fastening said engine compartment assembly, floor assembly, body side assemblies and roof assembly together; and grounding means for electrically connecting said engine compartment assembly, floor assembly, body side assemblies and roof assembly to each other.

* * * * *